June 13, 1967  K. CLÖS  3,324,781
FOCUSING DEVICE FOR TELEPHOTO OBJECTIVES
Filed Jan. 5, 1965  2 Sheets-Sheet 1
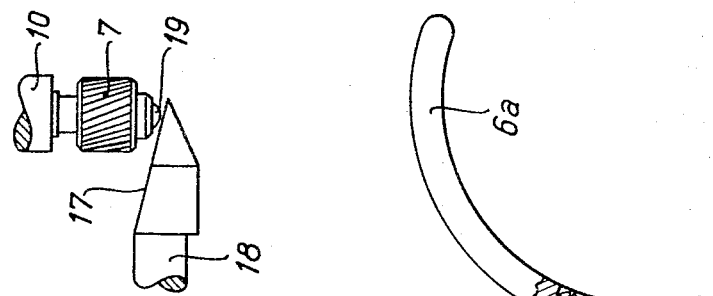
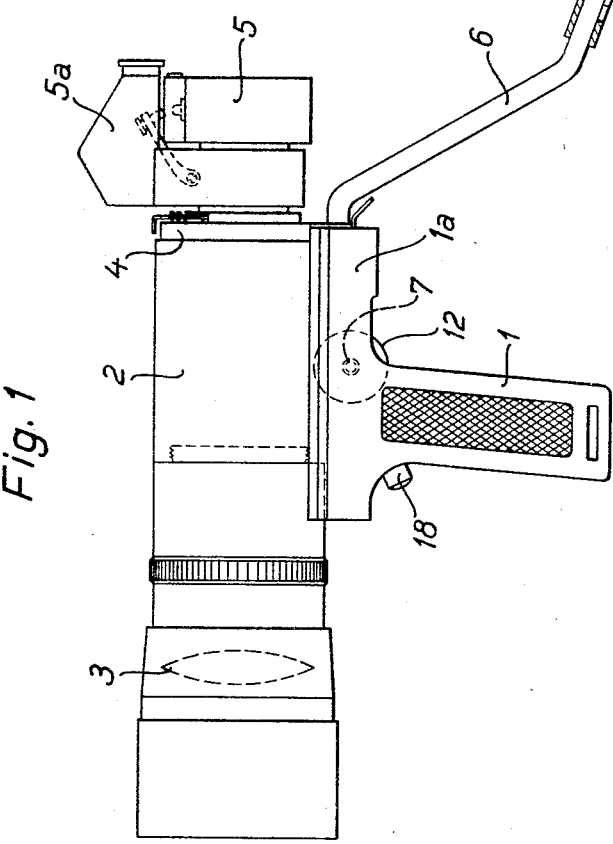
INVENTOR
Karl Clös
BY
Attorneys

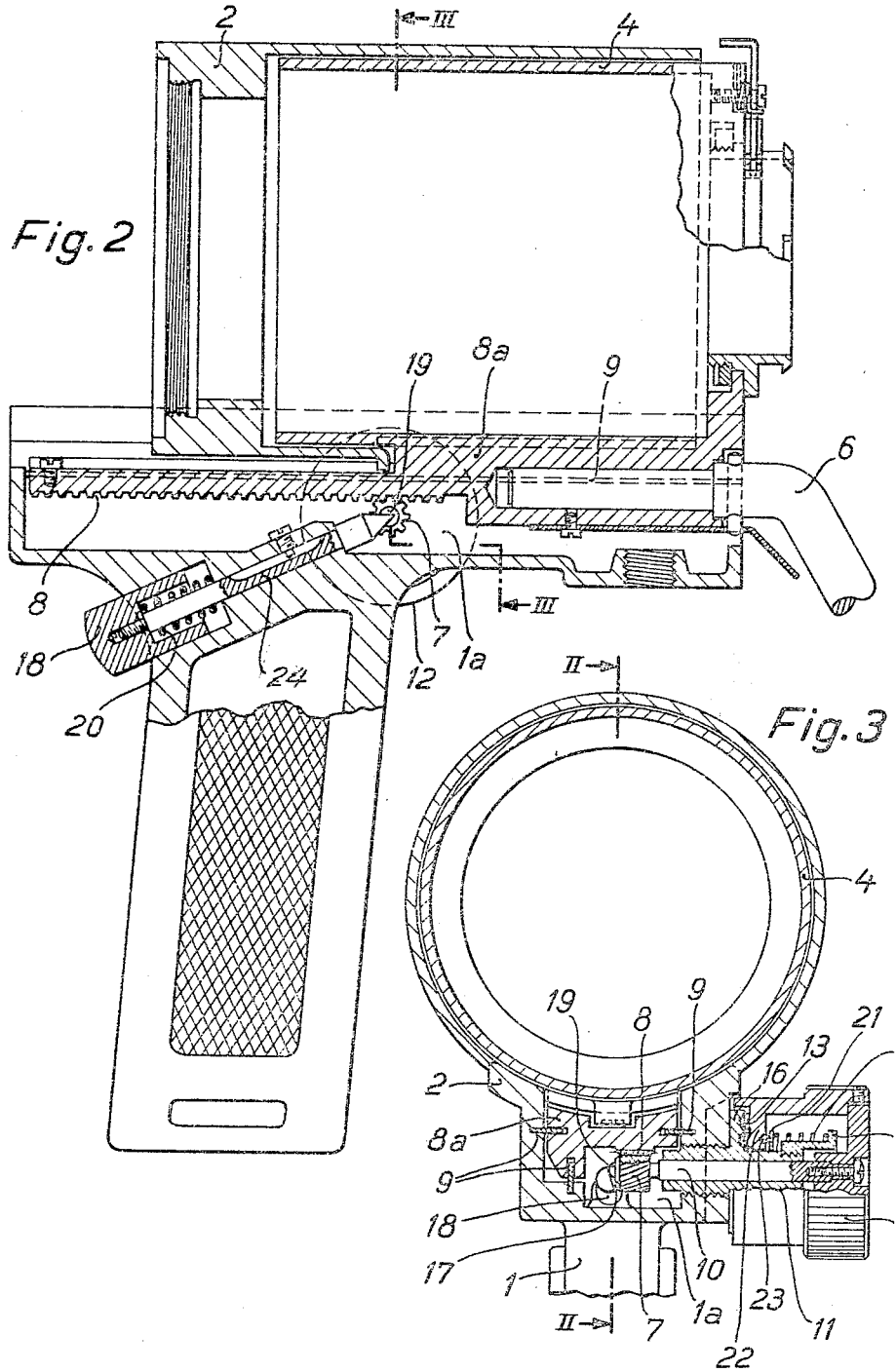

United States Patent Office
3,324,781
Patented June 13, 1967

3,324,781
FOCUSING DEVICE FOR TELEPHOTO
OBJECTIVES
Karl Clös, Katzenfurt, Germany, assignor to Ernst Leitz
G.m.b.H., Wetzlar, Germany, a corporation of
Germany
Filed Jan. 5, 1965, Ser. No. 423,491
Claims priority, application Germany, Feb. 5, 1964,
L 46,965
9 Claims. (Cl. 95—45)

The present invention relates to a focusing device for telephoto objectives as used in photography and serving as an attachment to a camera equipped for receiving exchangeable objectives.

Known telephoto lenses are, for example, provided with a telescopic mounting and focusing arrangement including telescopically positioned tubes which are axially adjustable relative to each other by means or gears. One of the tubes serves to support the objective lens assembly, while the other tube is equipped with locking means for attachment to the camera. It is also known to equip such telescopic tube arrangement with a pistol type grip for facilitating handling of the camera when the telephoto objective is attached thereto. Here it has to be taken under consideration that a telephoto objective having a long focal length and a reasonable large aperture is very heavy.

Furthermore, it is known to provide a rack and pinion gear for focusing of such lens in which the pinion is coupled to an externally accessible adjusting knob. It is further known to equip such a device with a releasable lock which arrests the telescopic mount in the adjusted position and prevents further coarse and fine adjustment. Of course, the objective mount can be locked into arresting position only after completion of focusing. On the other hand, no axial force in either direction along the optical axis must be exerted upon one of these telescopic tubes during focusing, because such force would tend to operate as an undesirable coarse adjustment of the focal length. Such an arrangement, however, has the disadvantage that the objective or, more precisely, the camera together with objective when attached thereto, must be supported freely by the photographer so that no forces in the direction of the optical axis are imparted upon the camera indeed.

This actually makes exact and accurate focusing practically impossible, and the difficulties are enhanced the heavier such objective is.

In order to provide support for such a heavy objective with camera attached, a shoulder support or rest has been suggested, but such a rest will, when used, exert a force upon the telescopic tubes arrangement pushing or pulling in the direction of the optical axis, so that actually during fine focusing the shoulder support cannot be used.

It is an object of the present invention to provide a focusing device for telephoto lenses of the character described permitting coarse and fine adjustment even while an axial force is exerted upon the telephoto lens mount. Moreover, the invention turns such a force into an advantage.

According to one aspect of the present invention in the preferred embodiment thereof, it is suggested to provide a telescopic mounting arrangement, one tube thereof being adapted for attachment to a camera, the other tube receiving the telephoto objective; the adjusting gear for the two telescopic tubes is supplemented with means permitting the gear to serve as a wedge lock. In particular, one of the gearing elements, for example, a pinion will be positioned on a shaft which shaft is adjustable by means of an externally accessible adjusting knob. This shaft is further positioned to permit axial movement thereof without disengagement of the pinions from the respective other gearing element, for example, a rack. The shaft with pinion and adjusting knob is additionally provided with means for frictional braking so that the friction impedes rotation.

In particular the shaft will be equipped with a brake disk type friction disk which is capable of engaging with or disengaging from a stationary positioned friction disk. Whenever these friction disks engage, no torque can be transmitted upon the pinion. When an external force is applied to the telescopic tubes, the gear tends to rotate the pinion but the gear distributes such a force also in axial direction of the pinion thereby reenforcing frictional engagement of the friction disks, which in turn, impedes rotation of the pinion so that the telescopic tubes cannot be shifted in axial direction. Thus, the friction disks supplement the gear to serve as a wedge lock.

On the other hand, the wedge lock can be overridden by manual adjustment of the knob which is under complete control of the photographer when focusing the camera. The axial forces mentioned above, transmitted upon the gear and causing the wedge lock to respond, result from the photographer's urging of the total assembly, including a shoulder support or rest against his shoulder to secure proper grip. Thereby it is within his power to control the amount of force exerted upon the adjusting knob, so that the extent of still permissible fine adjustment is under his complete control, while at no time this "optical"-axial force is capable of operating as an adjustment or mis-adjustment of the focal length.

The force distribution of such an "optical" axis force by the gear will cause the wedge lock to respond. To ensure such force distribution for wedge locking, the gear may be designed to have angled teeth. The friction disk on the shaft may additionally be spring biased so that the wedge lock responds instantly, and no physical axial movement of the knob or pinion shaft is necessary for locking of the gear. An external force of the character described and transmitted from the rack upon the pinion will tend to reinforce an initially already existing frictional engagement between the disk, and the actual amount of axial movement of the pinion will be infinitesimal, with no residual pinion rotation. In adidtion it is of advantage to provide means which opens up the wedge lock and actually causes disengagement of the friction disks to permit completely unimpeded coarse adjustment.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawing, in which:

FIGURE 1 illustrates somewhat schematically an overall view of a telephoto objective with pistol grip, shoulder support and attached camera;

FIGURE 2 illustrates a view taken along the optical axis of the supporting structure for the objective;

FIGURE 3 illustrates a cross-section view through the lines 3—3 in FIGURE 2; and FIGURE 4 illustrates a detail of the device shown in FIGURES 2 and 3 and in an enlarged view.

Proceeding now to the detailed description of the drawings, in FIGURE 1, thereof, there is shown the overall structural arrangement for attaching the objective of a telephoto lens assembly 3 to a photographic camera 5. The telephoto lens assembly 3 is removably screwed into an adjusting tube 2 telescopically received on a tubular mount 4 and capable of axial adjusting movement relative thereto. The tubular mount 4 is attached to the camera 5.

If the camera 5 is of the type in which the view and range finder path for normal photography is separated from the main image path, an adapter 5a may be interposed between the mount 4 and the camera 5 to convert the camera into a single lens reflex camera. A grip 1 of the pistol grip type is directly secured to the adjusting tube 2 by means of a pistol barrel type element and serving as manual supporting handle for the telephoto lens.

A shoulder support arrangement is secured to the tube mount 4. The shoulder support or rest 6 is comprised of a shoulder piece 6a and an adjustable tube 6b. The user can adapt the length of the entire shoulder rest as to his personal convenience and comfort. The end of the rod in tube 6b is connected to the barrel 1a.

Thus, it appears that, on one hand, the elements 4, 5, 6 and including eventually 5a, form a structural unit of rigidly interconnected parts, whereas the elements 1, 2 and 3 are structurally interconnected to form a second unit of likewise rigidly connected parts, whereby the unit formed of parts 1, 2 and 3 and the unit formed of parts 4, 5 and 6 are mutually adjustable relative to each other along the optical axis of objective 3.

Proceeding now to the description of FIGURES 2, 3 and 4, there is shown in detail how specifically the telescopic arrangement of tubes 2 and 4 can be adjusted relative to each other.

The pistol barrel type housing 1a receives a tooth rack carrier 8a which is secured to tubular mount 4 moving therewith. The carrier 8a carries the tooth rack 8, and is guided in barrel 1a by means of three guide rails 9. The guide rails 9 are secured in the body or barrel 1a, but they run in elongated slots of carrier 8a.

A tubular bearing 11 is secured to or being a part of the pistol barrel 1a. Bearing 11 has a cylindrical bore the axis of which extends transversely to the direction of extension of the guide rails 9 and of the tooth rack 8. This bearing 11 receives a shaft 10. Shaft 10 is permitted to rotate within bearing 11, and shaft 10 is also capable of axial shifting. The shaft 10 where projecting into the interior of barrel 1a carries a pinion 7 for meshing with the tooth rack 8. Upon rotation of pinion 7, rack 8 slides in the direction of the axis of tubes 2 and 4 which is the optical axis or runs parallel thereto. Since pinion 7 remains stationary relative to tube 2, tube 4 carrying rack 8 is thus moved axially relative to the tube 2 when pinion 7 rotates. Thereby the focusing position of objective 3 is adjusted.

The teeth of tooth rack 8 are angled relative to the direction of extension of the rack itself, and, accordingly, the teeth of pinion 7 are angled to establish a helical type gear. An externally accessible adjustment knob 12 is secured onto the outer end of shaft 10. The adjusting knob 12 has a pot shaped configuration, there being a collar 22 having a central bore for receiving the tubular bearing 11. A friction disk-ring 13 is secured to the outer surface of the collar 22.

The cavity defined by the knob structure receives a collar 14 which is attached to bearing 11. A compression spring 15 bears against the collar 14 and against a washer 21 to spread them apart. Washer 21 is preferably loosely seated on bearing 11, still inside of the cavity of knob 12. The inner surface of collar 22 has a V-shaped groove receiving a number of balls 23. When the knob 12 is turned, the rotation is not impeded by axial pressure exerted by spring 15 upon washer 21 and urging the washer against collar 22, because collar 22 runs on washer 21 in a ball bearing type structure. Compression spring 15 urges the knob 12 and particularly the collar 22 thereof together with the friction disk 13 in axial direction, and in the drawing of FIGURE 3, to the digit. This resilient bias permits an engagement of the rotatable friction disk 13 with a stationary friction disk 16 which is secured to the bearing 11.

A pushbutton 18 is mounted at the neck of grip 1 and is capable of actuating a plunger 24 against the pressure of a spring 20. The tip of plunger 24 terminates in a cone 17 or bevel bearing, bearing against a calotte shape control surface 19 which projects beyond pinion 7 and form the end proper or tip of shaft 10.

Upon pressing button 18 the plunger 24 moves towards a position in which the cone 17 causes axial retraction of shaft 10 against the pressure of the spring 15, and in effect decouples friction disks 13 and 16 without disengaging rack 8 from pinion 7. In this position now an unimpeded adjustment of the objective lens, via freely rotatable knob 12, pinion 7 and rack 8 is permitted for coarse focusing.

It is significant, that any force in axial (optical) direction exerted externally by unit 1, 2, 3 upon unit 4, 5, 6 or vice versa is directly effective in the rack and pinion arrangement. When button 18 is released, the friction disks 13 and 16 engage each other under the influence of spring 15, the knob 12 with the shaft 10 is at least partially impeded from rotation. The rack and pinion arrangement operating as a wedge lock reenforcing this frictional engagement of disks 13 and 16, so that shaft 10 is wedged in between the rack and the friction engagement of elements 13 and 16. This shall be explained more fully in the following:

If the photographer grips handle 1 and urges the rest 6 against his shoulder, he thereby exerts a pushing force upon telecope assembly 2–4 which is effective in the rack and pinion gear 7–8. The rack 8 is thereby urged to cause rotation of pinion 7, which rotation, if possible, would cause axial shifting of tubes 2–4 relative to each other. If the camera has already been focused, it would now be shifted out of focus.

Since the teeth of pinion 7 and rack 8 are angled, this force exerted by rack 8 upon pinion 7 will be distributed and an axial component is set up in pinion 7. The direction of the angled teeth in rack and pinion 8 and 7 respectively is not an arbitrary one but determines the direction of this axial component. It is clear that the pushing force set up by the photographer has one specific direction and acts upon rack 8 in but one direction parallel to the optical axis of the system. The resulting angular and axial forces in shaft 10 having thus a direction determined by the angle of the teeth of the gear. The direction of this force will always be same in shaft 10. The angle must be selected so that upon urging rest 6 against the shoulder by holding grip 1 the force imparted thereby from rack 8 upon the pinion 7 as far as the axis of shaft 10 is concerned, tends to move the shaft 10 to the left of FIGURE 3 so as to reenforce the frictional engagement of disks 13 and 16 thereby positively preventing rotation of disks 13 and 16 relative to each other. This, in turn, prevents rotation of disks 13 and 16 relative to each other. This, in turn, prevents pinion 7 from rotating so that rack 8 will not move in (optical) axial direction. Shaft 10 thus provides a wedge lock.

Thus, a force exerted by the user upon grip 1 and shoulder rest 6 finds rack 8 tending to cause rotation of pinion grip 7, but this gear is not capable of operating as a torque transmission gear due to friction, so that indeed the entire assembly of elements 1, 2, 3, 4, 5, 6 is urged against the shoulder of the user as if it were a compact and rigidly connected unit.

The pulling of grip 1 in the opposite direction does not occur during operation, so that no wedge lock provision is necessary for this case. However, it will be appreciated, that this wedge lock can be rendered effective for such oppositely directed pulling force simply by changing the direction of the angled teeth in the gear.

The entire focusing device is used as follows: The photographer carries the camera 5 in his right hand, since usually the release for the camera shutter is positioned to be actuated with the right hand while carrying the camera. With his left hand, he grips the pistol grip 1 while additionally the camera-objective structure bears and rests against his shoulder by means of the shoulder support 6, to secure firm handling of the equipment.

He now presses the button 18, thereby disengaging the disks 13 and 16 from each other. Thereafter he can rotate the knob 12 to adjust the lens mounting assembly 2 and 3 relative to the tubular mount 4 of the camera 5. While looking through the view finder, he thereby coarsely focuses the camera. Since collar 22 rotates freely on balls 23, and since no other frictional engagement is present, this coarse adjustment can be carried out unimpededly and very rapidly indeed.

After this coarse adjustment, the photographer releases the button 18, and the plunger 24 is retracted under the influence of the spring 20. Also, the shaft 10 is shifted axially under the influence of spring 15 thereby causing friction disk 13 to reengage friction disk 16. Now he uses the handle 1 to press the entire arrangement against his shoulder, to prevent any movement of the camera.

As was outlined in detail above, this force is distributed by the rack and pinion arrangement, to reenforce the frictional engagement of disks 13 and 16 and to impede any rotation of shaft 10, so that the gear 7–8 is wedge-locked; this force cannot change the focusing adjustment. On the other hand, the user can still adjust the focusing position of tubes 2–4 by means of the adjusting knob 12.

Upon manually actuating the knob 12, particularly if done by first lifting knob 12 somewhat against the pressure of spring 21, the friction as between the disks 13 and 16 is reduced or even eliminated but, of course, this does not release the wedge lock because by holding knob 12, the photographer prevents knob 12, shaft 10 and pinion 7 from rotating uncontrolled. It is now up to the user to balance on one hand the grip he has on the adjusting knob 12, and on the other hand he controls the pressure with which he urges the entire arrangement against his shoulder. In the particular position described above, i.e., with the left hand of the user holding the grip 1, he can use his thumb to adjust the knob 12, thereby rotating pinion 7, and the adjusting tube 2 is moved in axial direction for fine adjustment.

One can see that the user of the camera can control the fine focusing in a very advantageous manner. It is well known that for focusing, in general, it is very often undesirable to have a mechanism available that is too easily adjustable, and only a very skilled person will be able to properly adjust a very easy going focusing device without continuously over-shooting and having to move the adjustment back and forth. It is desirable to have such adjusting somewhat impeded and heavy going by a retarding force, thereby providing an advantageous "feel" for the adjustment. The focusing device in accordance with the invention permits the user of the camera to provide and control such a "feel": By more or less forcefully urging the entire arrangement via the grip 1 against his shoulder, he controls the impediment of rotation of pinion 7, shaft 10 and the knob 12. The more and the stronger he provides this force, the more is the adjusting of the focusing device retarded. By controlling this urging against the shoulder he can thus give himself just the right amount of "feel" he personally needs. It is significant that the urging against the shoulder by the handle 1 does not itself alter the focal adjustment.

It is a further significant aspect of the invention that the knob 12 is in a position which enables the photographer to operate the knob with the thumb on the same hand which holds the grip 1.

It is well understood that the embodiment described above is susceptible to modifications which do not constitute departures from the scope of the invention. First of all, it is possible to exchange the positions of the rack and pinion so that actually the knob 12, shaft 10 and pinion 7 are parts of the mount 4, while the movable rack is part of the pistol barrel 1a. The bearing 11 would then be mounted on the tube 4. Next, the pistol grip is convenient and preferred but not essential and any other kind of grip may be used.

The invention is not limited to the embodiments described above, but all changes and modifications thereof not constituting departures from the spirit and scope of the invention are intended to be covered by the following claims.

What is claimed is:

1. A focusing device for telephoto objectives comprising:
    a telescopic arrangement of first and second tubes, one of said tubes being adapted for attachment to a photographic camera, the other one of said tubes being adapted for mounting a telephoto objective;
    a gear having respectively first and second gear elements positively coupled to said first and second tubes to control relative axial movement of said tubes, and having an angled teeth arrangement, said first gear element being capable of rotation as well as axial displacement;
    adjusting means for externally operating said first gear element;
    and releasable friction means coupled to said adjusting means and being responsive to said axial displacement in one direction to impede frictionally rotation of said first gear element other than through said adjusting means, while being released to permit unimpeded rotation when said first gear element is axially displaced opposite to said one direction.

2. A focusing device for telephoto objectives comprising:
    a telescopic arrangement of first and second tubes, one of said tubes being adapted for attachment to a photographic camera, the other one of said tubes being adapted for mounting a thelephoto objective;
    gear means having first and second gear elements and coupling said said first and second tubes for mutural axial displacement;
    means coupled to said first gear element to operate said first gear element for said first gear element to cause relative axial displacement of said tubes via said second gear element;
    and friction means to lock said first gear element when actuated by said second gear element, due to a force exerted upon said second gear element by said second tube in one direction and transmitted upon the first gear element, the first gear element being unlocked in the absence of such force, 3. A focusing device for telephoto objectives comprising:
    a telescopic arrangement of first and second tubes, one of said tubes being adapted for attachment to a photographic camera, the other one of said tubes being adapted for mounting a telephoto objective;
    a gear having respectively first and second gear elements positively coupled to said first and second tubes to control relative axial movement of said tubes said first gear element being a pinion meshing said second gear element, said pinion being subjected to a torque and axial force transmission when an external force is applied relative to said first and second tubes in a direction of their common axis;
    an adjusting knob with axially movable shaft journalled at said first tube and coupled to said pinion;
    a first friction disk coupled to said shaft the first friction disk rotating upon rotation of the shaft, and moving axially upon axialy movement of the shaft;
    and a second friction disk mounted at said first tube for engagement with said first friction disk upon axial movement of said shaft in one direction, while disengaging from the first friction disk when said shaft moves in the opposite direction.

4. A focusing device for telephoto objectives as set forth in claim 3 comprising:

a spring for normally urging said disks into mutual and frictional engagement, said axial force transmission when ocurring reinforcing the pressure exerted by said spring upon said friction disks.

5. A focusing device for telephoto objectives as set forth in claim 3 comprising:
   resilient means for normally placing said disks into frictional engagement;
   and manually operating means for disengaging said disks.

6. A focusing device for telephoto objectives comprising:
   a telescopic arrangement of two tubes, one of which being adapted for attachment to a photographic camera, the other one of said tubes being adapted for mounting a telephoto objective, one of said tubes bearing a pistol grip type handle, the other one of tubes supporting a shoulder rest;
   a shaft with externally accessible adjusting knob axially slidably and rotatably mounted at a first one of said tubes, there being a pinion on said shaft;
   releasable friction means for impeding the rotation of said shaft when said shaft is axially moved in a first direction while permitting unimpeded rotation when the shaft is moved in a direction opposite to the first direction;
   actuating means at said handle for releasing said friction means by axially shifting said shaft in said opposite direction;
   and gearing means meshing with said pinion and being positively coupled to said second one of said tubes, said gearing means causing an axial shift of said pinion and of said shaft in said first direction when one of said tubes is externally axially urged relative to the respective other tube so that said gearing means, said pinion and said friction means forming a wedge lock.

7. A focusing device for telephoto objectives comprising:
   a telescopic arrangement of first and second tubes, one of said tubes being adapted for attachment to a photographic camera, the other one of said tubes being adapted for mounting a telephoto objective;
   an adjusting means mounted to said first tube and being movable for providing variable adjusting positions over a particular range, and being movable additionally into first and second positions for either of the adjusting positions;
   gear means coupled to said adjusting means and to said second tube for transmitting the variable adjusting positions of said adjusting means upon said second tube to move said first and second tubes relative to each other along their telescopic extension and for transmitting forces exerted upon the second tube to the adjusting means to assume, in dependence upon the direction of the forces, the first or the second position; and
   friction means coupled to and cooperating with said adjusting means for impeding motion of the adjusting means over the particular range of adjusting positions when in the first position while permitting the unimpeded variation of the adjusting position in said range when in the second position.

8. A focusing device for telephoto objectives comprising:
   a telescopic arrangement of a first and a second tube movable axially relative to each other, one of said tubes being adapted for attachment to a photographic camera, the other one of said tubes being adapted for mounting a telephoto objective;
   a first gear element mounted to said first tube for rotation about an axis and being movable in the direction of its own axis of rotation;
   an actuator knob for rotating said first gear element about said axis of rotation;
   a second gear element mounted to said second tube and meshing with the second gear element so that rotation of the first gear element is imparted upon said second tube as relative movement between the first and the second tubes, said first and second gear elements being constructed that an axial force exerted upon the second tube in a first direction imparts a force upon said first gear element and in a particular direction along its axis of rotation;
   friction means coupled to said first gear element for retarding rotation of the first gear element when the first gear element is subjected to a force in said particular direction along its axis of rotation, while releasing the gear element for rotation when no such force or a force in opposite direction is imparted upon the first gear element from said second gear element; and
   means for selectively releasing the friction means.

9. A focusing device for telephoto objectives comprising:
   a telescopic arrangement of two tubes, one of which being adapted for attachment to a photographic camera, the other one of said tubes being adapted for mounting a telephoto objective;
   a shaft with externally accessible adjusting knob axially slidably and rotatably mounted at a first one of said tubes;
   releasable friction means including a first element coupled to said shaft for rotation therewith and cooperating with a stationary friction means coupled to one of the tubes for impeding the rotation of said shaft when said shaft is axially moved towards the stationary friction element for engagement therewith, while permitting unimpeded rotation when the shaft is moved axially in the opposite direction so that that first friction element moves away from the stationary friction element;
   a pinion of said shaft; and
   gearing means meshing with said pinion, being positively coupled to said second one of said tubes, and being constructed to impart an axial force upon said pinion for moving said shaft in axial direction so that said first friction element on said shaft moves towards said stationary friction means when one of said tubes is externally urged relative to the respective other tube and in a particular direction so that that gearing means with said pinion and said friction means form a wedge lock.

References Cited

UNITED STATES PATENTS 2,920,545  1/1960  Kellner _____ 95—45
2,938,444  5/1960  Kellner _____ 95—45

JOHN M. HORAN, *Primary Examiner.*